United States Patent
Usami

(10) Patent No.: US 7,321,534 B2
(45) Date of Patent: Jan. 22, 2008

(54) SIGNAL OUTPUT METHOD AND OPTICAL INFORMATION RECORDING MEDIUM

(75) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 543 days.

(21) Appl. No.: 10/749,380

(22) Filed: Jan. 2, 2004

(65) Prior Publication Data

US 2004/0141437 A1    Jul. 22, 2004

(30) Foreign Application Priority Data

Jan. 8, 2003    (JP) .............................. 2003-001953

(51) Int. Cl.
*G11B 7/0045* (2006.01)
*G11B 20/10* (2006.01)
*G11B 15/52* (2006.01)

(52) U.S. Cl. ................ 369/59.11; 369/47.28; 369/53.21

(58) Field of Classification Search .............. 369/59.11
See application file for complete search history.

(56) References Cited

U.S. PATENT DOCUMENTS 5,327,411 A    7/1994    Iwasa et al.
6,243,339 B1 *  6/2001    Spruit et al. ............. 369/53.13
6,411,579 B2 *  6/2002    Nobukuni et al. ........ 369/59.11
6,529,467 B2 *  3/2003    Miyamoto et al. .......... 369/116
6,628,594 B1 *  9/2003    Park ........................ 369/59.11
2004/0008601 A1 *  1/2004    Sasaki et al. ............. 369/59.11

FOREIGN PATENT DOCUMENTS

EP    1059630 A1    12/2000
JP    2000-57571 A   2/2000
JP    2002-150563 A   5/2002

* cited by examiner

*Primary Examiner*—Wayne Young
*Assistant Examiner*—Parul Gupta
(74) *Attorney, Agent, or Firm*—Sughrue Mion, PLLC

(57) ABSTRACT

A signal output method for reducing jitter and forming pits having stable shapes on an optical information recording medium with high recording density is provided. A write signal includes a write permission signal including a repetition of write enable and pause intervals, and a write data signal outputted during the write enable interval. The write signal satisfies the formula $Tf_{max} - Tf_{min} \geq 0.01T$, where $Tf_{max}$ is an output interval of a first write data signal among write data signals corresponding to a write permission signal immediately subsequent to a pause interval when the pause interval of the write signal is a maximum, $Tf_{min}$ is an output interval of a first write data signal among write data signals corresponding to a write permission signal immediately subsequent to a pause interval of the write signal when the pause interval of the write signal is a minimum, and T is a reference period.

36 Claims, 5 Drawing Sheets

SIGNAL OUTPUT METHOD AND OPTICAL INFORMATION RECORDING MEDIUM

CROSS-REFERENCE TO RELATED APPLICATION

This application claims priority under 35 USC 119 from Japanese Patent Application No. 2003-001953, the disclosure of which is incorporated by reference herein.

BACKGROUND OF THE INVENTION

1. Field of the Invention

The present invention relates to a signal output method, and an optical information recording medium having information recorded thereon by the signal output method.

2. Description of the Related Art

On an optical information recording medium (recordable optical recording medium) such as a DVD-R or a DVD-RW, which is capable of recording information thereon, information is recorded by forming pits.

When recording information, laser pulse control, which is called "write strategy" (recording strategy), is used in order to accurately record pits on the order of submicrons, which pits are generated by thermal recording. This recording strategy is for enabling reproduction of a correct signal at the time of reproduction by conducting correction as described below. If a pit is formed while power corresponding to the pit length is sustained, a longer pit is actually formed by remaining heat resulting from a laser beam. Correction for this, and correction for a deviation in pit length caused by a difference in properties of the recording layer or a signal combination are conducted.

FIG. 5 shows this recording strategy in the case of an 8T signal. A portion P (write data signal) for forming a pit in this recording strategy includes a top pulse ($T_{top}$) having a front edge that lags behind a rising edge of a write signal (recording data:recording signal) by 1T or more and having a large pulse width, and five multipulses ($T_{mp}$) each having a pulse width smaller than that of the top pulse (those pulses are referred to as write pulses).

As examples of the recording strategy shown in FIG. 5, various recording strategies are known. Those recording strategies are suitably used in optical information recording on DVDs or the like (for example, see Japanese Patent Application Laid-Open (JP-A) No. 2002-150563).

However, if one attempts to apply such a strategy to an optical information recording media, which has a narrower track pitch and higher recording density than DVDs, it is difficult to form desired recording pits, and degradation in recording properties, such as jitter increasing, is observed.

The present invention has been achieved in order to solve the above-described problems.

It is an object of the invention to provide a signal output method capable of forming pits having stable shapes on an optical information recording medium having a narrower track pitch and a higher recording density as compared with conventional DVDs, and of reducing jitter in the reproduced signal, and to provide an optical information recording medium having information recorded thereon by the signal output method.

SUMMARY OF THE INVENTION

In order to achieve the object, the present inventors have investigated the reason why the conventional strategy cannot be applied to optical information recording media that are higher in recording density than conventional DVDs. As a result, the present inventors have found the following reason. Since the recording density becomes high, the spacing between pits becomes narrow. When one pit is formed and then the next pit is formed, heat remained from the time when the previous pit has been formed causes thermal interference on the next pit formation. Therefore, it becomes difficult to form desired pits. From such finding, the present inventors have thought of the invention described below.

A first aspect of the invention is to provide a signal output method for outputting a write signal in order to write information to an optical information recording medium. In the signal output method, the write signal includes a write permission signal including a repetition of a write enable interval and a pause interval, and a write data signal to be outputted during the write enable interval. Here, $Tf_{max}$ denotes an output interval of a first write data signal among write data signals corresponding to a write permission signal immediately subsequent to a pause interval of the write signal in a case in which the pause interval of the write signal is a maximum, $Tf_{min}$ denotes an output interval of the first write data signal among the write data signals corresponding to a write permission signal immediately subsequent to the pause interval of the write signal in a case in which the pause interval of the write signal is a minimum, and T denotes a reference period. Then the write signal is outputted in the signal output method so that $Tf_{max}$, $Tf_{min}$ and T satisfy the following formula (1):

$$Tf_{max} - Tf_{min} \geq 0.01T \qquad \text{Formula (1).}$$

A second aspect of the invention is to provide a signal output method for outputting a write signal in order to write information to an optical information recording medium. In the signal output method, the write signal includes a write permission signal including a repetition of a write enable interval and a pause interval, and a write data signal to be outputted during the write enable interval. Here, $Tl_{max}$ denotes an output interval of a last write data signal among write data signals corresponding to a write permission signal immediately preceding a pause interval of the write signal in a case in which the pause interval of the write signal is a maximum, $Tl_{min}$ denotes an output interval of the last write data signal among the write data signals corresponding to a write permission signal immediately preceding the pause interval of the write signal in a case in which the pause interval of the write signal is a minimum, and T denotes a reference period. Then the write signal is outputted in the signal output method so that $Tl_{max}$, $Tl_{min}$ and T satisfy the following formula (2):

$$Tl_{min} - Tl_{max} \geq 0.01T \qquad \text{Formula (2).}$$

A third aspect of the invention is to provide a signal output method for outputting a write signal in order to write information to an optical information recording medium. In the signal output method, the write signal includes a write permission signal including a repetition of a write enable interval and a pause interval, and a write data signal to be outputted during the write enable interval. Here, $Tf_{max}$ denotes an output interval of a first write data signal among write data signals corresponding to a write permission signal immediately subsequent to a pause interval of the write signal in a case in which the pause interval of the write signal is a maximum, $Tf_{min}$ denotes an output interval of a first write data signal among the write data signals corresponding to a write permission signal immediately subsequent to the pause interval of the write signal in the case in which the pause interval of the write signal is a minimum, $Tl_{max}$ denotes an output interval of a last write data signal among write data signals corresponding to a write permission signal immediately preceding a pause interval of the write signal in the case in which the pause interval of the write signal is the maximum, $Tl_{min}$ denotes an output interval of a last write data signal among write data signals corresponding to a write permission signal immediately preceding the pause interval of the write signal in the case in which the pause interval of the write signal is the minimum, and T denotes a reference period. Then the write signal is outputted in the signal output method so that $Tf_{max}$, $Tf_{min}$, $Tl_{max}$, $Tl_{min}$ and T satisfy the following formulae (1) and (2):

$$Tf_{max} - Tf_{min} \geq 0.01T \qquad \text{Formula (1)}.$$

$$Tl_{min} - Tl_{max} \geq 0.01T \qquad \text{Formula (2)}.$$

A fourth aspect of the invention is to provide an optical information recording medium on which information is recorded by using a signal output method according to any one of the first to third aspects of the invention.

DETAILED DESCRIPTION OF THE INVENTION

Figure 1:
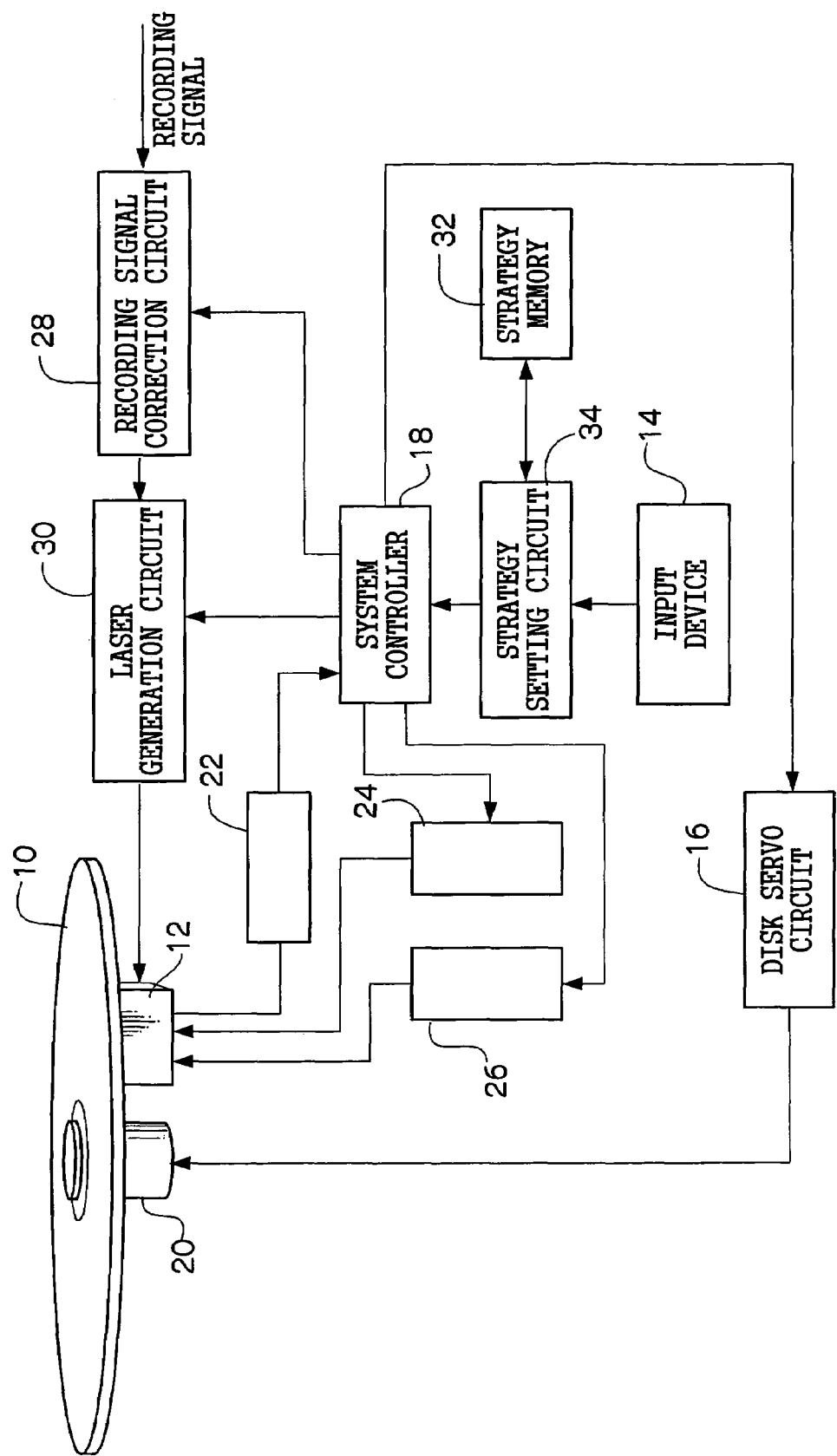
FIG. 1 is a block diagram of an embodiment of the present invention.

Hereafter, an embodiment of the present invention will be described in detail with reference to the drawings. FIG. 1 is a block diagram showing an example of an optical disk recording and reproducing apparatus to which the embodiment can be applied.

As shown in FIG. 1, an optical head 12 formed of a recording semiconductor laser and a plurality of photo-detectors is disposed on a beam incidence plane side (cover layer side) of an optical disk 10, which is an optical information recording medium of write once type, rewritable type or the like. An input device 14 for setting a recording speed magnification (1×, 2×, 3×, 4×, . . . ) according to user's operation is provided in the optical disk recording and reproducing apparatus.

The input device 14 is connected to a strategy setting circuit 34 for reading out a plurality of recording strategies (such as a time modulation quantity or recording power) stored in a recording strategy memory 32 according to data lengths of recording signal and for setting a plurality of recording strategies according to a recording speed magnification inputted from the input device 14, in a system controller 18.

A disk servo circuit 16 is connected to the system controller 18. The disk servo circuit 16 controls the rotation of a disk motor 20 with a recording speed magnification set at the input device 14 and with a constant linear velocity according to a control signal supplied from the system controller 18. This constant linear velocity control can be implemented by detecting wobbles from output signals of photo-detectors in the optical head 12, and conducting PLL control on the disk motor 20 so as to detect wobbles at a predetermined frequency.

The recording speed is preferably set to 3.8 m/sec or more, more preferably 4.2 m/sec or more, still more preferably 4.5 m/sec or more. The upper limit in recording speed is preferably set to 40 m/sec, more preferably 22 m/sec, and still more preferably 12 m/sec.

The output signals of the photo-detectors in the optical head 12 are inputted to the system controller 18 via an RF amplifier unit 22 including a focus error signal generation circuit and a tracking error signal generation circuit.

The system controller 18 outputs a command based on a focus error signal and a tracking error signal supplied from the RF amplifier unit 22 to a focus and tracking circuit 24. On the basis of the command supplied from the system controller 18, the focus and tracking circuit 24 conducts focus and tracking control on a laser beam of 500 nm or less (preferably 350 to 500 nm) outputted from a semiconductor laser or the like in the optical head 12.

The tracking control is conducted by detecting a pre-groove formed on the optical disk. Irradiation of the laser beam is conducted from a cover layer side of the optical information recording medium.

As a laser light source having an oscillation wavelength of 500 nm or less, for example, a blue-violet semiconductor laser having an oscillation wavelength in the range of 390 to 415 nm, a blue-violet SHG laser having a center oscillation wavelength of approximately 430 nm and the like can be mentioned.

In order to increase the recording density, an objective lens used in a pickup has preferably a numerical aperture (NA) of at least 0.7, and more preferably at least 0.85.

A feed servo circuit 26 is connected to the system controller 18. On the basis of a command supplied from the system controller 18, the feed servo circuit 26 controls a feed motor to move the optical head 12 in a diameter direction of the disk 10.

As for recording signal (recording data) for recording information on the optical disk 10, input data is provided with error check codes, subcode information and the like by a recording signal generation circuit, which is not illustrated, and the recording signal is generated as a serial data signal having a standard format and a transfer rate based on an inputted recording speed magnification, and inputted to a recording signal correction circuit 28. The recording signal inputted to the recording signal correction circuit 28 is modulated according to the data length by a recording strategy, which is set according to the recording speed magnification inputted from the input device 14, and inputted to a laser generation circuit 30. According to the corrected recording signal, the laser generation circuit 30 drives the semiconductor laser of the optical head 12, irradiates a recording surface of the optical disk 10 with a laser beam, forms pits, and conducts recording. Laser power at this time is controlled by an auto power control circuit to become desired power. It is preferable that the signal is recorded by pulse length modulation.

A recording strategy applied to the signal output method of the invention and recorded in the recording strategy memory 32 will now be described with reference to FIGS. 2 and 3. In addition, the signal output method of the invention will be described.

Figure 2:
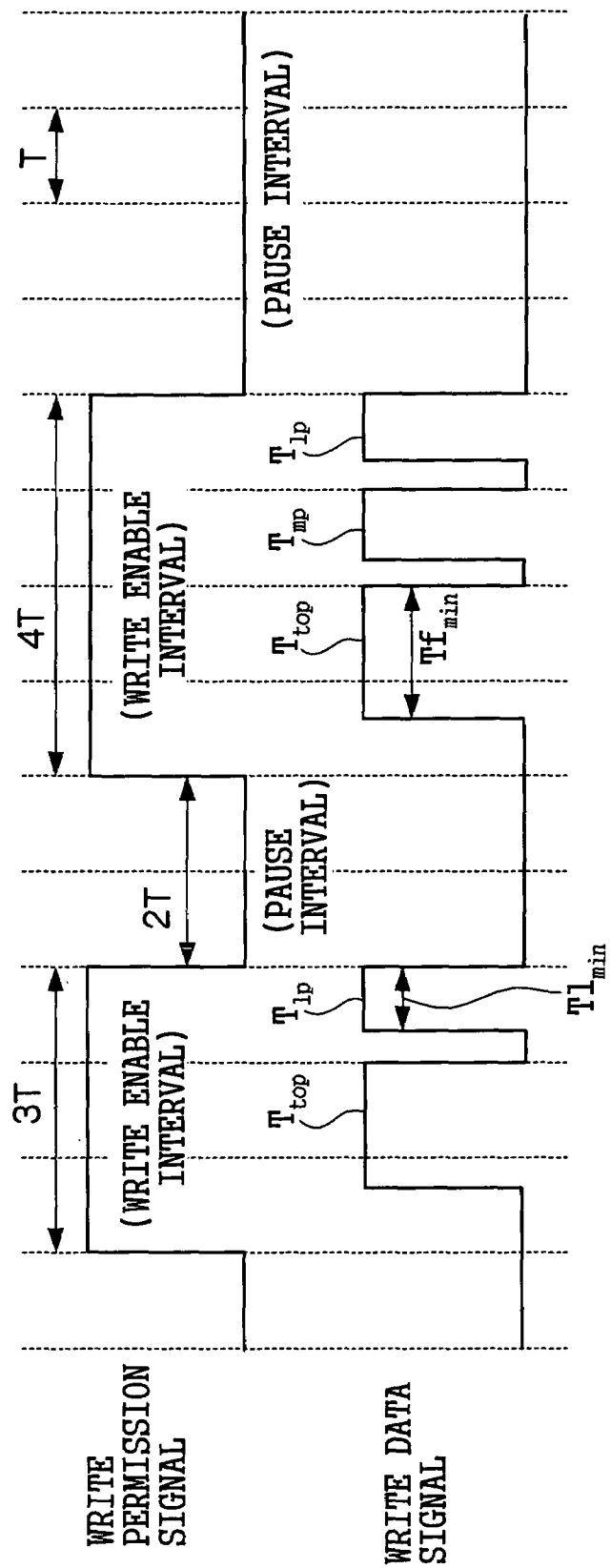
FIG. 2 is a view showing an example of a waveform diagram (recording strategy) of a recording laser beam in the embodiment.

A write signal shown in FIG. 2 includes a write permission signal illustrated in an upper section and a write data signal illustrated in a lower section. In the example shown in FIG. 2, the write permission signal includes a 3T signal and a 4T signal as a write enable interval, and includes a 2T signal as a pause interval between them. Actually the write enable interval and the pause interval are set according to the pit length corresponding to information to be recorded. The write enable interval and the pause interval having a predetermined length are repeated.

The write data signal includes signals to be outputted within the write enable interval. Specifically, the write data signal includes pulse trains each including one or more pulses as shown in FIGS. 2 and 3.

For forming pits corresponding to the 3T signal, a top pulse and a last pulse are outputted as shown in FIG. 2. For subsequently forming pits corresponding to the 4T signal, a top pulse, a multipulse, and a last pulse are outputted successively.

Figure 3:
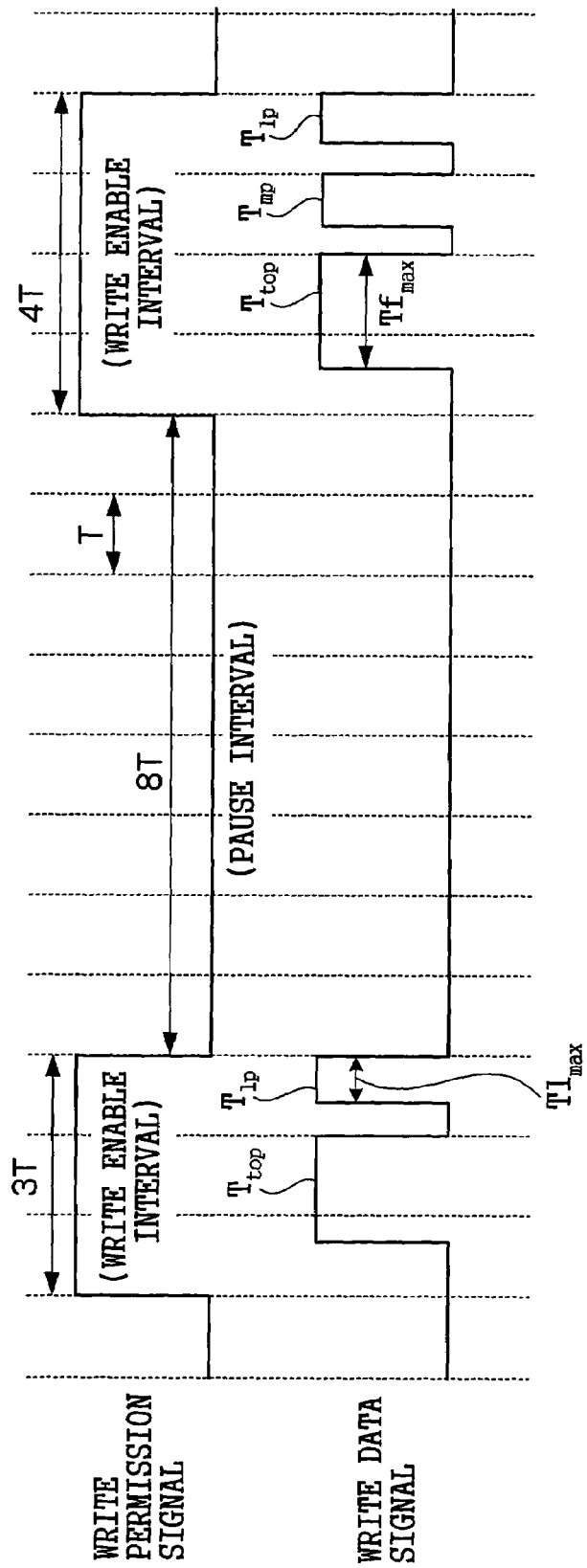
FIG. 3 is a view showing another example of a waveform diagram of a recording laser beam in the embodiment.

The pause interval may become 2T as shown in FIG. 2 or may become 8T as shown in FIG. 3. In other words, the pause interval differs according to data to be written. If an output interval of a first write data signal (top pulse $T_{top}$) outputted immediately after a pause interval, or an output interval of a last write data signal (last pulse $T_{lp}$) among write data signals outputted immediately before a pause interval are made always constant regardless of the above pause interval, the thermal and optical interference between formed pits increases and favorable jitter cannot be obtained especially in the case in which the pause interval is the shortest. Such a phenomenon appears remarkably in the case in which the recording density is increased as compared with currently used DVDs and the like.

On the other hand, in the case in which the pause interval becomes the longest, the thermal influence is slight and the power becomes rather insufficient as compared with the case where the pause interval is short.

In order to remove such harmful effects, therefore, first to third signal output methods using write signals (recording strategies) described below are adopted in the invention.

(First Signal Output Method)

In the case in which a pause interval for a write signal is maximum, an output interval of a first write data signal ($T_{top}$) among write data signals corresponding to a write permission signal immediately after the pause interval is denoted by $Tf_{max}$. In the case in which a pause interval is minimum, an output interval of a first write data signal among write data signals corresponding to a write permission signal immediately after the pause interval is denoted by $Tf_{min}$. A reference period is denoted by T. In a first signal output method according to the invention, write signals are outputted so that $Tf_{max}$, $Tf_{min}$ and T satisfy the following formula (1):

$$Tf_{max} - Tf_{min} \geq 0.01T \qquad \text{Formula (1).}$$

By setting $Tf_{max} - Tf_{min}$ to at least 0.01T, it is possible to solve the problems and reduce jitter in the reproduced signal. In order to further reduce the jitter, $Tf_{max} - Tf_{min}$ is preferably set to at least 0.02T, more preferably at least 0.04T, still more preferably at least 0.06T. Considering the practicality, $Tf_{max} - Tf_{min}$ is preferably set to at most 0.4T, more preferably at most 0.25T, still more preferably at most 0.15T.

(Second Signal Output Method)

In the case in which a pause interval for a write signal is maximum, an output interval of a last write data signal ($T_{lp}$) among write data signals corresponding to a write permission signal immediately before the pause interval is denoted by $Tl_{max}$. In the case in which a pause interval is minimum, an output interval of a last write data signal among write data signals corresponding to a write permission signal immediately after the pause interval is denoted by $Tl_{min}$. A reference period is denoted by T. In a second signal output method according to the invention, write signals are outputted so that $Tl_{max}$, $Tl_{min}$ and T satisfy the following formula (2):

$$Tl_{min} - Tl_{max} \geq 0.01T \qquad \text{Formula (2).}$$

By setting $Tl_{min} - Tl_{max}$ to at least 0.01T, it is possible to solve the problems and reduce jitter in the reproduced signal. In order to further reduce the jitter, $Tl_{min} - Tl_{max}$ is preferably set to at least 0.02T, more preferably at least 0.04T, still more preferably at least 0.06T. Considering the practicality, $Tl_{min} - Tl_{max}$ is preferably set to at most 0.4T, more preferably at most 0.25T, still more preferably at most 0.15T.

(Third Signal Output Method)

In a third signal output method according to the invention, the write signals are outputted so that $Tf_{max}$, $Tf_{min}$, $Tl_{max}$, $Tl_{min}$ and T satisfy the following formulae (1) and (2):

$$Tf_{max} - Tf_{min} \geq 0.01T \qquad \text{Formula (1).}$$

$$Tl_{min} - Tl_{max} \geq 0.01T \qquad \text{Formula (2).}$$

The preferred range for each of $Tf_{max} - Tf_{min}$ and $T_{min} - Tl_{max}$ is the same as that in the first signal output method or the second signal output method.

By setting widths (output intervals) of both the top pulse and the last pulse according to the length of the pause interval, the jitter can be reduced with more certainty.

In any case of the first to third signal output methods, it is preferable that the width of the top pulse is set to a value in the range of 0.5T to 1.8T, and more preferably in the range of 0.7T to 1.5T.

It is preferable that the width of the last pulse is set to a value in the range of 0.2T to 0.9T, and more preferably in the range of 0.3T to 0.7T.

It is now supposed that pits each having a pit length of nT should be formed, wherein n is an integer in the range of 2 to 8 and T is a channel clock period. In the recording strategy according to the invention, it is preferable that the total number of the top pulse $T_{top}$ the last pulse $T_{lp}$ and the multipulses $T_{mp}$ is set to n-1.

According to the modulation system, however, the shortest pulse does not necessarily become 2T, and the longest pulse does not necessarily become 8T.

It is preferable that the width of each of one or more multipulses ($T_{mp}$ with the top pulse and the last pulse not included) formed in a signal of 3T or more is in the range of 0.4T to 0.84T from the viewpoint that the influence of the thermal interference should be suppressed and the integrated irradiation power of the laser should be increased. It is more preferable that the width is in the range of 0.5T to 0.8T. It is still more preferable that the width is in the range of 0.6T to 0.78T.

By the way, one $T_{mp}$ is formed in one T. Widths of $T_{mp}$'s may be the same or may be different.

If a recording speed magnification is inputted from the input device 14, according to the invention, the strategy setting circuit 34 reads, for example, a recording strategy of 2T to 8T from the recording strategy memory, substitutes a value of T corresponding to the recording speed magnification for T, and sets a recording strategy corresponding to the recording speed magnification in the system controller 18. According to the recording strategy thus set, the system controller 18 controls the recording signal correction circuit 28 and thereby applies modulation on the length of a pit forming portion in the recording data. Furthermore, according to the set recording strategy, the system controller 18 controls the laser generation circuit 30 and thereby conducts intensity modulation on the laser power. As a result, the pit forming portion and the land forming portion on the optical disk are irradiated with a laser beam having power that is similar in shape to the recording strategy. Furthermore, the system controller 18 controls the disk servo circuit 16, and thereby controls the rotation of the disk motor 20 so that the disk motor has a speed corresponding to a commanded recording speed magnification. As a result, recording on the optical disk is conducted. The optical disk having information thus recorded has been reduced in jitter.

As for the optical information recording medium to which the signal output method of the invention can be applied, there is no special restriction so long as information can be recorded on the optical information recording medium with a laser beam of 500 nm or less (preferably 350 to 500 nm). The optical information recording medium may be any of the phase change type, magneto-optical type, dye type and the like, and may be any of the rewritable type and the write once type. From the viewpoint that there is thermal interference in heat mode recording, however, an optical information recording medium of the write once and dye type is the most favorable.

Hereafter, as a specific example of the optical information recording medium, a configuration of an optical information recording medium of the write once and dye type will be described. For example, it is preferable that the optical information recording medium has a configuration in which a light reflection layer, a recording layer, and a cover layer are formed successively on a substrate. It is more preferable that the cover layer is formed on the recording layer via an adhesive layer. The invention is not limited to this.

(Substrate)

As for the substrate, various materials used as the substrate material of conventional optical information recording media can be arbitrarily selected and used.

Specifically, glass; acrylic resin such as polycarbonate or polymethyl methacrylate; vinyl chloride resin such as polyvinyl chloride or a vinyl chloride copolymer; epoxy resin; amorphous polyolefin; polyester; metal such as aluminum; and the like can be mentioned, and a mixture thereof can be used as occasion demands.

Among the above-described materials, polycarbonate and amorphous polyolefin are preferable from the viewpoint of moisture resistance, size stability, and a lower price. Polycarbonate is especially preferable. It is preferable that the substrate has a thickness of 1.1±0.3 mm.

Guide grooves for tracking or unevenness (grooves) representing information such as an address signal are formed on the substrate. It is preferable that a substrate having grooves formed thereon with a track pitch narrower than that on CD-Rs or DVD-Rs is used to achieve a higher recording density. It is indispensable that the grooves have a track pitch in the range of 200 to 400 nm. It is preferable that the grooves have a track pitch in the range of 250 to 350 nm. It is indispensable that the grooves have a depth in the range of 20 to 150 nm. It is preferable that the grooves have a depth in the range of 50 to 100 nm.

The grooves have preferably a width in the range of 50 to 250 nm, and more preferably 100 to 200 nm. The grooves have preferably a groove inclination angle in the range of 20 to 80°, more preferably 30 to 70°.

Figure 4:
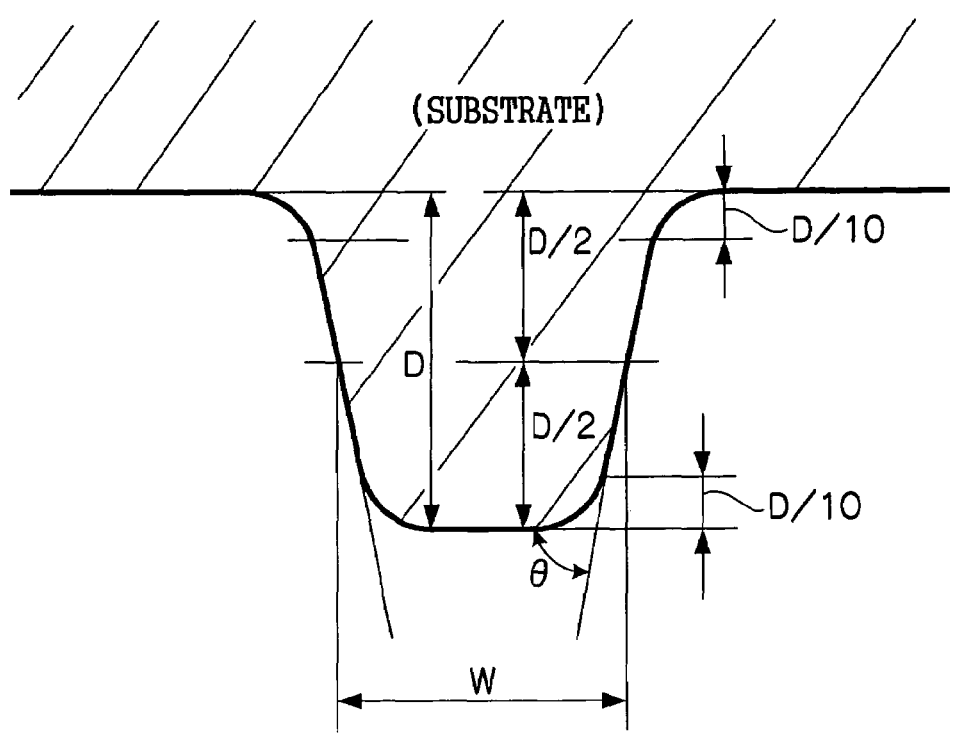
FIG. 4 is a partial sectional view showing a shape of a groove on a substrate.
Figure 5:
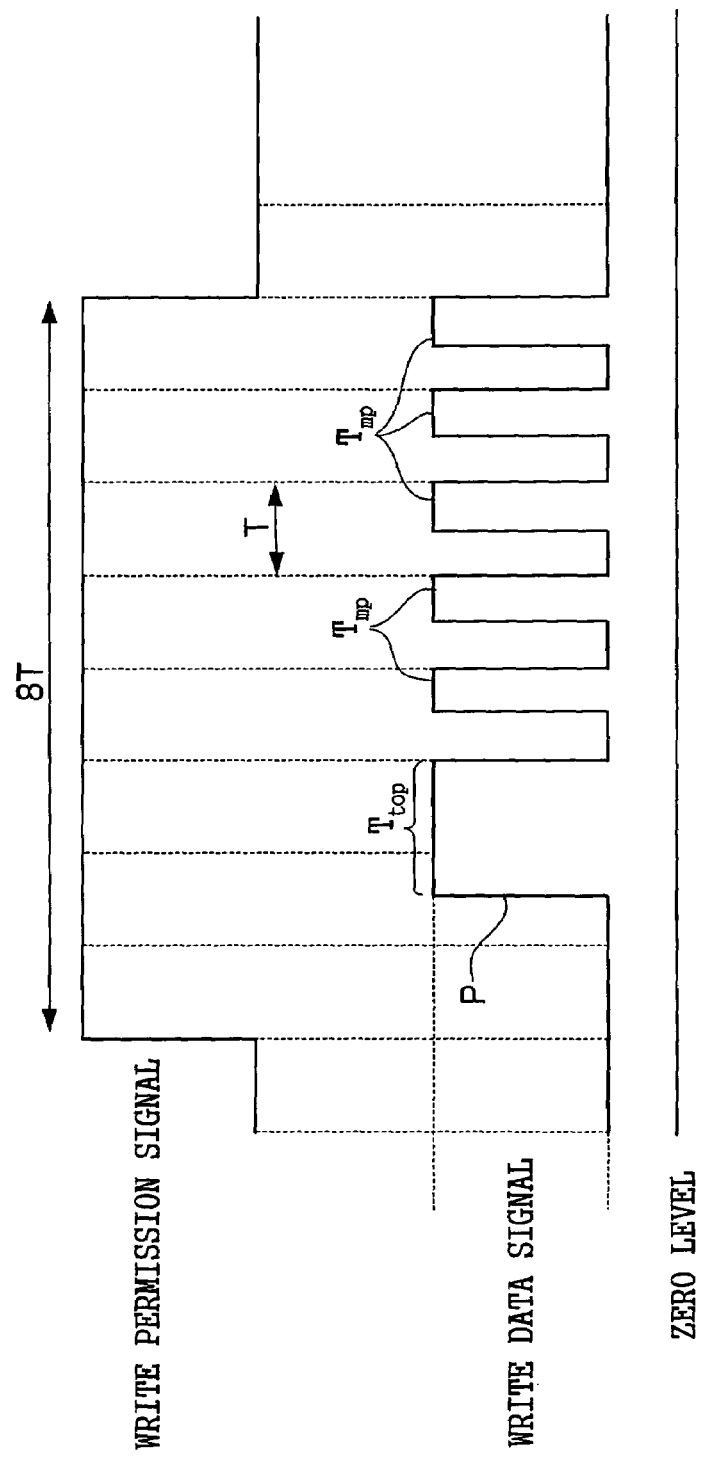
FIG. 5 is a waveform view of a recording laser beam in a conventional technique.

FIG. 4 is a schematic sectional view showing a shape of a groove. As defined in FIG. 4, a groove depth D is a distance between a substrate surface before groove formation and the deepest portion of the groove. A groove width W is a width of the groove at a depth of D/2. A groove inclination angle θ is an angle that is formed by a straight line drawn between an inclined portion located at a depth of D/10 from the substrate surface before groove formation and an inclined portion located at a height of D/10 from the groove bottom, and the substrate surface. These values can be measured by an atomic force microscope (AFM).

It is preferable that an undercoat layer is formed on the substrate surface on which a light reflection layer described later is provided, for the purpose of improving the planeness and adhesiveness.

Examples of the material of the undercoat layer include a polymer substance such as polymethyl methacrylate, acrylate-methacrylate copolymer, styrene-maleic anhydride copolymer, polyvinyl alcohol, N-methylol acrylamide, styrene-vinyltoluene copolymer, chlorosulfonic polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene or polycarbonate; and a surface modifier such as a silane coupling agent.

The undercoat layer can be formed by dissolving or dispersing the above-described material in an appropriate solvent, thereby preparing a coating liquid, and then applying the coating liquid to the surface of the substrate by means of a coating method such as spin coating, dip coating, or extrusion coating. Generally, the undercoat layer has a layer thickness in the range of 0.005 to 20 µm, and preferably 0.01 to 10 µm.

(Light Reflection Layer)

The light reflection layer is an arbitrary layer formed as occasion demands. For the light reflection layer, a light reflective substance having a high reflectance for laser light is used. It is preferable that the reflectance is at least 70%.

Examples of the light reflective substance having a high reflectance include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, or stainless steel. These light reflective substances may be used singly, or may be used as a combination of two or more kinds, or may be used as an alloy. Among them, Cr, Ni, Pt, Cu, Ag, Au, Al and stainless steel are preferable. Au, Ag Al or their alloys are especially preferable. Au, Ag or their alloys are the most preferable.

The light reflection layer can be formed on the substrate by, for example, evaporating, sputtering or ion-plating the above-described light reflective substance. Generally, the light reflection layer has a layer thickness in the range of 10 to 300 nm, and preferably 50 to 200 nm.

(Recording Layer)

The recording layer is formed on the substrate (on a light reflection layer, in the case in which the light reflection layer is formed). Information can be recorded on the recording layer by a laser beam having a wavelength of 500 nm or less. It is preferable that the recording layer contains a dye.

By the way, the recording layer is not restricted to dye type containing a dye. The recording layer may be of the phase change type or the magneto-optical type.

The dye contained in the recording layer as the recording substance may be either of a phase change metal compound and an organic compound.

Specific examples of the organic compound include a cyanine dye, an oxonol dye, a metal complex dye, an azo dye, a phthalocyanine dye and the like.

Furthermore, dyes described in JP-A Nos. 4-74690, 8-127174, 11-53758, 11-334204, 11-334205, 11-334206 and 11-334207, and JP-A Nos. 2000-43423, 2000-108513 and 2000-158818 can be suitably used.

In addition, the recording substance is not restricted to dyes, but an organic compound such as a triazole compound, a triazine compound, a cyanine compound, a merocyanine compound, an aminobutadiene compound, a phthalocyanine compound, a cinnamate compound, a viologen compound, an azo compound, an oxonolbenzooxazole compound or a benzotriazole compound, is suitably used. Among these compounds, a cyanine compound, an aminobutadiene compound, a benzotriazole compound, and a phthalocyanine compound are especially preferable.

The recording layer is formed by dissolving a recording substance such as a dye, together with a binder or the like in an appropriate solvent, thereby preparing a coating liquid, then applying the coating liquid onto a light reflection layer formed on the surface of the substrate, thereby forming a coating film, and then drying the coating film. Generally, the coating liquid has preferably a concentration of a recording substance in the range of 0.01 to 15% by mass, more preferably 0.5 to 5% by mass, and most preferably 0.5 to 3% by mass.

Examples of the solvent for the coating liquid include ester such as butyl acetate, ethyl lactate or Cellosolve acetate; ketone such as methyl ethyl ketone, cyclohexanone or methyl isobutyl ketone; chlorinated hydrocarbon such as dichloromethane, 1,2-dichloroethane or chloroform; amide such as dimethylformamide; hydrocarbon such as methyl cyclohexane; ether such as tetrahydrofuran, ethyl ether or dioxane; alcohol such as ethanol, n-propanol, isopropanol, or n-butanol diacetone alcohol; a fluorine solvent such as 2,2,3,3-tetrafluoropropanol; and glycol ether such as ethyleneglycol monomethyl ether, ethyleneglycol monoethyl ether or propyleneglycol monomethyl ether.

Considering the solubility of the recording substance in use, the solvents can be used singly or in a combination of two or more kinds. In addition, various kinds of additives such as an antioxidant, a UV absorber, a plasticizer or a lubricant may be added to the coating liquid according to the object.

In the case in which a binder is used, examples of the binder include a natural organic polymer substance such as gelatin, a cellulose derivative, dextran, rosin or rubber; and synthetic organic polymers including hydrocarbon resin such as polyethylene, polypropylene, polystyrene or polyisobutylene, vinyl resin such as polyvinyl chloride, polyvinylidene chloride or polyvinyl chloride-polyvinyl acetate copolymer, acrylic resin such as polyacrylic methyl or polymethacrylic methyl, an initial condensate of heat-curable resin such as polyvinyl alcohol, chlorinated polyethylene, epoxy resin, butyral resin, a rubber derivative or phenol-formaldehyde resin. In the case where a binder is used jointly as the material of the recording layer, the amount of the binder to be used is generally in the range of 0.01 to 50 times (in mass ratio) as compared with the recording substance, preferably 0.1 to 5 times (in mass ratio). The recording substance in the coating liquid thus prepared generally has a concentration in the range of 0.01 to 10% by mass, and preferably 0.1 to 5% by mass.

As the coating method, a spray method, a spin coat method, a dip method, a roll coat method, a blade coat method, a doctor roll method and a screen printing method can be mentioned. The recording layer may be either of a single layer and a multi-layer. The layer thickness of the recording layer is generally in the range of 20 to 500 nm, preferably 30 to 300 nm, more preferably 50 to 100 nm.

It is possible to make the recording layer contain various anti-fading agents in order to improve the light stability of the recording layer.

As the anti-fading agent, a singlet oxygen quencher is generally used. As the singlet oxygen quencher, quenchers already described in known publications such as Patent Publications can be used.

As specific examples, those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, Japanese Patent Application Publication (JP-B) Nos. 1-38680 and 6-26028, German Patent No. 350399, and Journal of The Chemical Society of Japan, October 1992, p. 1141 can be mentioned.

The amount of the anti-fading agent such as the singlet oxygen quencher to be used is generally in the range of 0.1 to 50% by mass, preferably in the range of 0.5 to 45% by mass, more preferably in the range of 3 to 40% by mass, particularly preferably in the range of 5 to 25% by mass as compared with the quantity of the dye.

(Adhesive Layer)

The adhesive layer is an arbitrary layer formed in order to improve the adhesiveness between the recording layer and a cover layer described later.

As the material for forming the adhesive layer, photo-curable resin is preferable. Above all, resin having a low shrinkage on curing is preferable in order to prevent warpage of the disk. As such photo-curable resin, for example, UV curable resins (UV curable adhesives) such as "SD-640" and "SD-347" manufactured by Dainippon Ink and Chemical Inc. can be mentioned. The adhesive layer has preferably a thickness in the range of 1 to 1000 μm, more preferably in the range of 5 to 500 μm, particularly preferably in the range of 10 to 100 μm in order to provide elasticity.

By the way, in the case where a pressure sensitive adhesive is provided on an adhesion surface of a cover sheet serving as a cover layer, the adhesive is not needed.

(Cover Layer)

The cover layer is formed to protect the inside of the optical information recording medium against a shock or the like. The cover layer is not especially restricted in material, so long as it is transparent. However, it is preferable that the material of the cover layer is polycarbonate or cellulose triacetate. It is more preferable that the material has a hygroscopicity of 5% or less at 23° C. and 50% RH.

By the way, "transparent" means that the material is transparent to such a degree that it transmits a recording beam and a reproducing beam (with a transmittance of at least 90%).

The cover layer is formed by dissolving photo-curable resin for forming the adhesive layer in an appropriate solvent to prepare a coating liquid, then applying the coating liquid onto a recording layer at a predetermined temperature to form a coating film, laminating a cellulose triacetate film (TAC film) obtained by, for example, extruding plastic onto the coating film, and irradiating the coating film with a beam via the laminated TAC film to cure the coating film. It is preferable that the TAC film contains an ultraviolet ray absorber. The cover layer has a thickness in the range of 0.01 to 0.2 mm, preferably in the range of 0.03 to 0.1 mm, more preferably in the range of 0.05 to 0.095 mm.

Furthermore, it is also possible to use polycarbonate or the like as the cover sheet.

For viscosity control, the coating temperature is preferably in the range of 23 to 50° C., more preferably in the range of 24 to 40° C., still more preferably in the range of 25 to 37° C.

In order to prevent the warpage of the disk, it is preferable that irradiation of the coating film with ultraviolet rays is conducted by using a light irradiator (preferably a UV irradiator) of pulse type. It is preferable that the pulse interval is one msec or less. It is more preferable that the pulse interval is a μsec or less. The amount of irradiation light in one pulse is not especially limited. However, the amount of irradiation light in one pulse is preferably 3 kW/cm² or less, more preferably 2 kW/cm² or less.

The number of times of irradiation is not especially limited. However, the number of times of irradiation is preferably 20 or less, more preferably 10 or less.

In an optical information recording medium according to the invention, a dielectric layer or a light transmission layer can be formed between the light reflection layer and the recording layer on the basis of the properties of the recording layer. The dielectric layer is formed of a material such as an oxide, a nitride, a carbide or a sulfide containing at least one of Zn, Si, Ti, Te, Sm, Mo and Ge. They may be hybridized as represented by ZnS—SiO$_2$.

The light transmission layer is not restricted in material so long as the material has a transmittance of at least 90% at a laser wavelength. For example, materials similar to those for the dielectric layer can be used.

The dielectric layer or the light transmission layer can be formed by using a conventional known method. It is preferable that the dielectric layer has a thickness in the range of 1 to 100 nm. It is preferable that the light transmission layer has a thickness in the range of 1 to 100 nm.

An optical information recording medium according to the invention having information recorded thereon by using the optical information recording method according to the invention is different in information recording strategy from the conventional optical information recording medium. Since intersymbol interference is reduced, the jitter property becomes especially favorable.

EXAMPLES

The present invention will be described more specifically with reference to the following examples. However, the invention is not restricted to the examples.

[Production of Optical Information Recording Medium]

On a surface having grooves, of a substrate formed of polycarbonate resin by injection molding, a reflection layer (having a thickness of 100 nm) made of Ag is formed in an Ar atmosphere by DC sputtering (trade name: Cube, manufactured by Unaxis Corporation). Film thickness adjustment is conducted by using sputtering time.

The substrate has a thickness of 1.1 mm, an outside diameter of 120 mm and an inside diameter of 15 mm, and has spiral grooves (having a groove depth of 34 nm, a width of 140 nm and a track pitch of 320 nm). The inclination angle of grooves measured by the AFM is 60°.

A dye of 2 g represented by the following chemical formula is added to and dissolved in 2,2,3,3-tetrafluoropropanol of 100 ml to prepare a dye coating liquid. In the formula, Rn represents α-SO$_2$C$_4$H$_9$ and M represents Cu. The prepared dye coating liquid is applied onto the reflection layer by using the spin coat method under the condition of 23° C. and 50% RH while changing the number of revolutions from 300 to 4000 rpm. Thereafter, the medium is preserved at 23° C. and 50% RH for one hour, and then the recording layer is formed so as to have a thickness of 140 nm in the grooves (in-groove portions) and a thickness of 80 nm in land portions (on-groove portions).

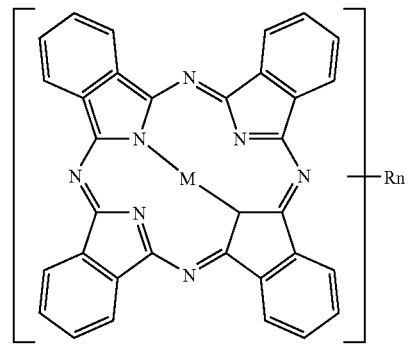

After the recording layer is formed, anneal treatment is conducted in a clean oven. The anneal treatment is conducted at 80° C. for one hour while the substrate is supported at a perpendicular stack pole by using a spacer.

Thereafter, a barrier layer (having a thickness of 5 nm) of ZnS/SiO$_2$ (where ZnS:SiO$_2$=8:2 in mass ratio) is formed on the recording layer by RF sputtering. The barrier layer forming condition is as follows:

| | |
|---|---|
| Power | 4 kw, |
| Pressure | $2 \times 10^{-2}$ hPa, |
| Time | 2 seconds. |

A cover sheet made of polycarbonate and provided with a pressure sensitive adhesive on its adhesion surface is stuck on the barrier layer to form an optical information recording medium.

A total thickness of the cover sheet and a layer composed of pressure sensitive adhesive in the produced optical information recording medium is approximately 100 μm.

Example 1

Information is recorded on the produced optical information recording medium and reproduced therefrom.

As the recording strategy in recording, a recording strategy is adopted, in which an output interval of a first data write signal (top pulse) immediately subsequent to a pause interval and an output interval of a last data write signal (last pulse) immediately before the pause interval are set as shown in Tables 1 and 2 according to the length of the pause interval (in the range of 2 to 8T). An output interval of a multipulse is set to a constant value of 0.73T.

Signals are sent by using MSG2 manufactured by Pulstec Industrial Co., Ltd. A clock frequency of 66 MHz, a linear velocity of 5.4 m/sec, recording power of 5.7 mW and reproduction power of 0.4 mW are used.

Information recorded on the optical information recording medium is reproduced and its jitter (multi-track jitter) is measured. The result of the measurement is 9.9%.

TABLE 1

| Length of immediately preceding pause interval | Output interval of top pulse | | | | | | |
|---|---|---|---|---|---|---|---|
| | 2 | 3 | 4 | 5 | 6 | 7 | 8 |
| 2 | 1.28 | 1.28 | 1.28 | 1.28 | 1.28 | 1.28 | 1.28 |
| 3 | 1.32 | 1.32 | 1.32 | 1.32 | 1.32 | 1.32 | 1.32 |
| 4 | 1.32 | 1.32 | 1.32 | 1.32 | 1.32 | 1.32 | 1.32 |
| 5 | 1.34 | 1.34 | 1.34 | 1.34 | 1.34 | 1.34 | 1.34 |
| 6 | 1.34 | 1.34 | 1.34 | 1.34 | 1.34 | 1.34 | 1.34 |
| 7 | 1.34 | 1.34 | 1.34 | 1.34 | 1.34 | 1.34 | 1.34 |
| 8 | 1.34 | 1.34 | 1.34 | 1.34 | 1.34 | 1.34 | 1.34 |

*) Each of numerical values in the Table is multiplied by the clock period T.

The way of reading Table 1 is as follows: when outputting a signal in the range of 2T to 8T immediately after a pause interval having a length of 2T, its top pulse has an output interval of 1.28T in any cases. The way of looking at Table 2 is also the same.

TABLE 2

| Length of immediately subsequent pause interval | Output interval of last pulse | | | | | | |
|---|---|---|---|---|---|---|---|
| | 2 | 3 | 4 | 5 | 6 | 7 | 8 |
| 2 | — | 0.75 | 0.75 | 0.75 | 0.75 | 0.75 | 0.75 |
| 3 | — | 0.74 | 0.74 | 0.74 | 0.74 | 0.74 | 0.74 |
| 4 | — | 0.73 | 0.73 | 0.73 | 0.73 | 0.73 | 0.73 |
| 5 | — | 0.73 | 0.73 | 0.73 | 0.73 | 0.73 | 0.73 |
| 6 | — | 0.73 | 0.73 | 0.73 | 0.73 | 0.73 | 0.73 |
| 7 | — | 0.73 | 0.73 | 0.73 | 0.73 | 0.73 | 0.73 |
| 8 | — | 0.73 | 0.73 | 0.73 | 0.73 | 0.73 | 0.73 |

*) Each of numerical values in the Table is multiplied by the clock period T.

Example 2

The output interval of the top pulse is set as shown in Table 1, and information is recorded in the same way as the example 1 except that the last pulse is set equal to a constant value of 0.75T.

Information recorded on the optical information recording medium is reproduced, and its jitter is measured. The result of the measurement is 10.5%.

Comparative Example 1

Information is recorded in the same way as the example 1 except that the output interval widths of the top pulse and the last pulse are set to constant values of 1.28T and 0.75T, respectively, irrespective of the length of the pause interval.

Information recorded on the optical information recording medium is reproduced, and its jitter is measured. The result of the measurement is 15%.

What is claimed is:

1. A signal output method comprising:
   providing a write permission signal including a repetition of a write enable interval and a pause interval;
   providing a write data signal to be output during the write enable interval;
   outputting a write signal including the write permission signal and the write data signal; and
   writing information to an optical information recording medium by using the write signal,
   wherein Tfmax denotes an output interval of a first write data signal among write data signals corresponding to a write permission signal immediately subsequent to a pause interval of the write signal in a case in which the pause interval of the write signal is a maximum,
   Tfmin denotes an output interval of a first write data signal among the write data signals corresponding to a write permission signal immediately subsequent to the pause interval of the write signal in a case in which the pause interval of the write signal is a minimum,
   T denotes a reference period, and
   wherein the write signal is outputted so that Tfmax, Tfmin and T satisfy the following formula (1):

$$Tfmax - Tfmin \geq 0.01T, \text{ and} \qquad \text{Formula (1):}$$

wherein Tfmax and Tfmin actively write information to the recording medium by forming a recording pit thereon.

2. A signal output method according to claim 1, wherein the write signal is outputted so that Tfmax, Tfmin and T satisfy the following formula:

$$0.4T \geq Tfmax - Tfmin\ 0.06T.$$

3. A signal output method according to claim 1, wherein the write signal is outputted so that Tfmax, Tfmin and T satisfy the following formula:

$$Tfmax - Tfmin = 0.25T.$$

4. A signal output method according to claim 1, wherein the write signal is outputted so that Tfmax, Tfmin and T satisfy the following formula:

$$Tfmax - Tfmin = 0.15T.$$

5. A signal output method according to claim 1, wherein the write signal is outputted so that Tfmax, Tfmin and T satisfy the following formulae:

$$1.8T \geq Tfmax \geq 0.5T$$

$$1.8T \geq Tfmin\ 0.5T.$$

6. A signal output method according to claim 1, wherein the write signal is outputted so that Tfmax, Tfmin and T satisfy the following formulae:

$$1.5T \geq Tfmax \geq 0.7T$$

$$1.5T \geq Tfmin \geq 0.7T.$$

7. A signal output method according to claim 1, wherein when Tmp denotes an output interval of each write data signal except the first and the last write data signals among the write data signals, the write signal is outputted so that Tmp and T satisfy the following formula:

$$0.84T \geq Tmp \geq 0.4T.$$

8. A signal output method according to claim 1, wherein when Tmp denotes an output interval of each write data signal except the first and the last write data signals among the write data signals, the write signal is outputted so that Tmp and T satisfy the following formula:

$$0.78T \geq Tmp \geq 0.6T.$$

9. A signal output method comprising:
   providing a write permission signal including a repetition of a write enable interval and a pause interval;
   providing a write data signal to be output during the write enable interval;
   outputting a write signal including the write permission signal and the write data signal; and writing information to an optical information recording medium by using the write signal, wherein Tlmax denotes an output interval of a last write data signal among write data signals corresponding to a write permission signal immediately preceding a pause interval of the write signal in a case in which the pause interval of the write signal is a maximum, Tlmin denotes an output interval of the last write data signal among the write data signals corresponding to a write permission signal immediately preceding the pause interval of the write signal in a case in which the pause interval of the write signal is a minimum, T denotes a reference period, and wherein the write signal is outputted so that Tlmax, Tlmin and T satisfy the following formula (2):

$$Tlmin - Tlmax \geq 0.01T, \text{ and} \qquad \text{Formula (2):}$$

wherein Tlmax and Tlmin actively write information to the recording medium by forming a recording pit thereon.

10. A signal output method according to claim 9, wherein the write signal is outputted so that Tlmax, Tlmin and T satisfy the following formula:

$$0.4T \geq Tlmin - Tlmax \geq 0.06T.$$

11. A signal output method according to claim 9, wherein the write signal is outputted so that Tlmax, Tlmin and T satisfy the following formula:

$$Tlmin - Tlmax = 0.25T.$$

12. A signal output method according to claim 9, wherein the write signal is outputted so that Tlmax, Tlmin and T satisfy the following formula:

$$Tlmin - Tlmax = 0.15T.$$

13. A signal output method according to claim 9, wherein the write signal is outputted so that Tlmax, Tlmin and T satisfy the following formulae:

$$0.9T \geq Tlmax \geq 0.2T$$

$$0.9T \geq Tlmin \geq 0.2T.$$

14. A signal output method according to claim 9, wherein the write signal is outputted so that Tlmax, Tlmin and T satisfy the following formulae:

$$0.7T \geq Tlmax \geq 0.3T$$

$$0.7T \geq Tlmin \geq 0.3T.$$

15. A signal output method according to claim 9, wherein when Tmp denotes an output interval of each write data signal except first and last write data signals among write data signals, the write signal is outputted so that Tmp and T satisfy the following formula:

$$0.84T \geq Tmp \geq 0.4T.$$

16. A signal output method according to claim 9, wherein when Tmp denotes an output interval of each write data signal except first and last write data signals among write data signals, the write signal is outputted so that Tmp and T satisfy the following formula:

$$0.78T \geq Tmp \geq 0.6T.$$

17. A signal output method according to claim 9, wherein Tfmax denotes an output interval of a first write data signal among write data signals corresponding to a write permission signal immediately subsequent to a pause interval of the write signal in the case in which the pause interval of the write signal is the maximum, Tfmin denotes an output interval of a first write data signal among the write data signals corresponding to a write permission signal immediately subsequent to a pause interval of the write signal in the case in which the pause interval of the write signal is the minimum, and wherein the write signal is outputted so that Tfmax, Tfmin and T satisfy the following formula (1):

$$Tfmax - Tfmin \geq 0.01T \qquad \text{Formula (1).}$$

18. An optical information recording medium having information recorded thereon by using a signal output method, the signal output method comprising:

providing a write permission signal including a repetition of a write enable interval and a pause interval;

providing a write data signal to be output during the write enable interval;

outputting a write signal including the write permission signal and the write data signal; and writing information to an optical information recording medium by using the write signal, wherein Tfmax denotes an output interval of a first write data signal among write data signals corresponding to a write permission signal immediately subsequent to a pause interval of the write signal in a case in which the pause interval of the write signal is a maximum, Tfmin denotes an output interval of a first write data signal among the write data signals corresponding to a write permission signal immediately subsequent to the pause interval of the write signal in a case in which the pause interval of the write signal is a minimum, T denotes a reference period, and wherein the write signal is outputted so that Tfmax, Tfmin and T satisfy the following formula (1):

$$Tfmax - Tfmin \geq 0.01T, \text{ and} \qquad \text{Formula (1):}$$

wherein Tfmax and Tfmin actively write information to the recording medium by forming a recording pit thereon.

19. An optical information recording medium according to claim 18, wherein information can be recorded thereon by using a laser beam having a wavelength in the range of 350 nm to 500 nm.

20. An optical information recording medium according to claim 18, wherein the optical information recording medium is a write once type and a dye type.

21. An optical information recording medium having information recorded thereon by using a signal output method, the signal output method comprising:

providing a write permission signal including a repetition of a write enable interval and a pause interval;

providing a write data signal to be output during the write enable interval;

outputting a write signal including the write permission signal and the write data signal; and writing information to an optical information recording medium by using the write signal, wherein Tlmax denotes an output interval of a last write data signal among write data signals corresponding to a write permission signal immediately preceding a pause interval of the write signal in a case in which the pause interval of the write signal is a maximum, Tlmin denotes an output interval of the last write data signal among the write data signals corresponding to a write permission signal immediately preceding the pause interval of the write signal in a case in which the pause interval of the write signal is a minimum, T denotes a reference period, and
wherein the write signal is outputted so that Tlmax, Tlmin and T satisfy the following formula (2):

$$Tlmin - Tlmax \geq 0.01T, \text{ and} \qquad \text{Formula (2):}$$

wherein Tlmax and Tlmin actively write information to the recording medium by forming a recording pit thereon.

22. An optical information recording medium according to claim 21, wherein information can be recorded thereon by using a laser beam having a wavelength in the range of 350 nm to 500 nm.

23. An optical information recording medium according to claim 21, wherein the optical information recording medium is a write once type and a dye type.

24. A signal output method according to claim 1, further comprising:
  setting one of a plurality of recording strategies according to a recording speed magnification; and
  modulating at least one of $Tf_{max}$ and $Tf_{min}$ according to the set recording strategy, wherein the pause interval is set by the set recording strategy.

25. A signal output method according to claim 9, further comprising:
  setting one of a plurality of recording strategies according to a recording speed magnification; and
  modulating at least one of $Tl_{max}$ and $Tl_{min}$ according to the set recording strategy, wherein the pause interval is set by the set recording strategy.

26. A signal output method according to claim 17, further comprising:
  setting one of a plurality of recording strategies according to a recording speed magnification; and
  modulating at least one of $Tf_{max}$ and $Tf_{min}$ according to the set recording strategy, wherein the pause interval is set by the set recording strategy.

27. An optical information recording medium according to claim 18, wherein the signal output method further comprises:
  setting one of a plurality of recording strategies according to a recording speed magnification; and
  modulating at least one of $Tf_{max}$ and $Tf_{min}$ according to the set recording strategy, wherein the pause interval is set by the set recording strategy.

28. An optical information recording medium according to claim 21, wherein the signal output method further comprises:
  setting one of a plurality of recording strategies according to a recording speed magnification; and
  modulating at least one of $Tl_{max}$ and $Tl_{min}$ according to the set recording strategy, wherein the pause interval is set by the set recording strategy.

29. A signal output method according to claim 1, wherein,
  each of the write data signals form a recording pit on a recording medium for recording information thereon; and
  recording pits are not formed during a pause interval.

30. A signal output method according to claim 29, wherein the formation of a pit at a first single signal level and non-formation of a pit at a second single signal level are in a binary sequence with each other.

31. A signal output method according to claim 9, wherein,
  each of the write data signals form a recording pit on a recording medium for recording information thereon; and
  recording pits are not formed during a pause interval.

32. A signal output method according to claim 31, wherein the formation of a pit at a first single signal level and non-formation of a pit at a second single signal level are in a binary sequence with each other.

33. An optical information recording medium according to claim 18, wherein,
  each of the write data signals form a recording pit on the optical information recording medium for recording information thereon; and
  recording pits are not formed during a pause interval.

34. An optical information recording medium according to claim 33, wherein the formation of a pit at a first single signal level and non-formation of a pit at a second single signal level are in a binary sequence with each other.

35. An optical information recording medium according to claim 21, wherein,
  each of the write data signals form a recording pit on the optical information recording medium for recording information thereon; and
  recording pits are not formed during a pause interval.

36. An optical information recording medium according to claim 35, wherein the formation of a pit at a first single signal level and non-formation of a pit at a second single signal level are in a binary sequence with each other.

* * * * *